United States Patent [19]

Wells

[11] 4,020,464
[45] Apr. 26, 1977

[54] PROGRAMMER EXPANDER FOR A PLURALITY OF DEVICES
[75] Inventor: William R. Wells, Linewood, N.J.
[73] Assignee: United Audio Visual Corporation, Mays Landing, N.J.
[22] Filed: July 9, 1974
[21] Appl. No.: 486,805
[52] U.S. Cl. .................. 340/147 P; 340/147 C; 340/166 R
[51] Int. Cl.² .................................. H04P 3/00
[58] Field of Search ....... 340/147 P, 147 C, 147 R, 340/166 R, 163

[56] References Cited
UNITED STATES PATENTS

| | | | |
|---|---|---|---|
| 3,002,115 | 9/1961 | Johnson | 340/147 P |
| 3,274,553 | 9/1966 | Oya | 340/147 P |
| 3,643,217 | 2/1972 | Morphew | 340/147 P |
| 3,815,092 | 6/1974 | Stephenson | 340/147 P |

Primary Examiner—Harold Pitts
Attorney, Agent, or Firm—Seidel, Gonda & Goldhammer

[57] ABSTRACT

The operational states of a plurality, p, of devices is controlled in response to pre-programmed information stored in m channels of a memory device, where m is an integer. The stored information is represented by m digital signals. An encoder combines n of the m digital signals, where $n < m$, and generates a set of encoded signals. A gating circuit gates the $(m-n)$ digital signals not encoded by the encoder with the set of encoded signals and generates a plurality, p, of output signals, where $p > m$, for controlling the operational states of the p devices.

20 Claims, 8 Drawing Figures

PROGRAMMER EXPANDER FOR A PLURALITY OF DEVICES

BACKGROUND OF THE INVENTION

The present invention relates to a programmer control for a plurality of devices. More particularly, it relates to a programmer control for a plurality of slide projectors and associated audio-visual devices.

In recent years, audio-visual performances using multiple slide projectors and other audio-visual aids have become so complex that an electronic means for arranging the projection sequences has become a necessity. Such an electronic means is hereinafter referred to as a programmer.

Basically, a programmer is a special purpose computer; it serves as a memory storage and retrieval unit for controlling the sequence of operation of a plurality of slide projectors and other audio-visual devices. A good example of such a programmer is the UAV Cuemaster Mark 60 programmer manufactured by United Audio-Visual Corporation.

In general, the operation of the programmer is determined by a punched tape which serves as the memory storage facility. Typically, the punched tape may be an eight channel tape which is one inch wide and composed of paper, plastic film or combinations thereof. The eight channel tape contains the program which determines the sequence of operation of eight slide projectors or other audio-visual devices, and it is provided with one or more holes on each line across the width of the tape. Each of the holes corresponds to a data channel which is connected to a particular audio-visual device. The data may serve to actuate a projector, a dissolve unit, a light, a tape recorder, and so forth.

The tape is fed through an electro-optical tape reader which reads the information on the tape, line by line, and feeds the information to signal processing circuitry in the programmer. The signal processing circuitry receives the tape reader outputs and generates appropriate electronic signals for controlling the audio-visual devices in accordance with the information on the tape. Therefore, each line of holes on the tape corresponds to a particular state or condition of the audio-visual devices. A series of lines, then, corresponds to a sequence of operations of the audio-visual devices or, in other words, a program.

Any number of holes up to eight may be punched on a particular line on the tape, and the particular holes punched will be determined by the particular audio-visual devices which are to be operated at a given instant of time during a performance. Each line on the tape corresponds to a particular instant of time in the audio-visual performance. At each such instant of time, the audio-visual devices may be cued, that is, the state or condition of the audio-visual devices may be changed. As a result, a line on the punched tape may be termed a "cue". Thus, the totality of lines or cues on the tape carries the necessary information for controlling the sequence of operation of the eight audio-visual devices over the time interval of a complete performance.

Although each cue on the tape contains the necessary information for determining the state of particular audio-visual devices at a given instant of time, it may be required that a particular operating state be maintained for a predetermined interval of time without altering the states of any of the audio-visual devices. In that case, a series of cues on the tape will not be punched and, accordingly, the tape reader will scan these cues without generating any electronic signals at the input of the signal processing circuitry. The audio-visual devices, therefore, will not change their states until a cue is reached which contains one or more punched holes.

A programmer such as the UAV Cuemaster has the ability to read an eight hole punched tape at different speeds. At normal speed, the tape reader will read a cue on the tape, proceed to the next cue and then stop. The tape reader will not read the cue to which it has advanced until commanded to do so by a manually operated switch.

In addition, the tape reader may be made to advance and read successive cues automatically. For example, in the UAV Cuemaster, the tape reader may automatically scan the tape at 20 or 60 cues per second. These are called the high speed modes. In the high speed modes, the capacity of the system is limited somewhat because the eighth channel on the tape is no longer used to control a particular audio-visual device. Instead, the eighth channel is used to provide a stop command which serves to stop the reader from advancing further after it has automatically scanned a designated number of cues. Thus, the system capacity is limited to seven channels.

The capacity of the prior art programmer is therefore severely limited. Thus, in the normal mode of operation, the tape reader advances by single cues in response to manually initiated commands, and each channel on the tape corresponds to one of the eight audio-visual devices. In the high speed modes, the tape reader automatically scans the tape at the rates of 20 or 60 cues per second, and only seven of the eight channels correspond to audio-visual devices, the eighth channel being used for the stop command. Accordingly, depending upon the mode of operation of the tape reader, a maximum of either seven or eight audio-visual devices can be controlled by a single programmer.

In order to increase the capacity of the system that is, the number of audio-visual devices that can be controlled by the programmer; it is necessary to connect a plurality of programmers in series. Thus for example, five programmers may be connected in series to provide the capacity for operating 40 audio-visual devices. This, however, is a costly and cumbersome procedure which increases the opportunity for operator error since the programmers must be manually adjusted to operate in identical modes.

A principal advantage of the present invention is that, using a standard eight channel punched tape, at least 40 audio-visual devices may be controlled by means of a single tape reader and a single programmer.

A further advantage of the present invention is that the capacity of a programmer is increased in an economical manner without incurring any loss in performance time otherwise arising from the manual adjustment of a plurality of series connected programmers.

Other advantages appear in the description of the invention hereinafter.

BRIEF SUMMARY OF THE INVENTION

The present invention comprises an encoder for generating a plurality of output signals in response to a first portion of pre-programmed information, a gating circuit for generating a plurality of control signals in response to said encoder output signals and a second portion of said pre-programmed information, and a relay circuit for operating a plurality of devices in response to said gating circuit control signals.

A voltage isolation circuit generates the input signals for said encoder and said gating circuit in response to said pre-programmed information.

For the purpose of illustrating the invention, there are shown in the drawings forms which are presently preferred; it being understood, however, that this invention is not limited to the precise arrangements and instrumentalities shown.

DETAILED DESCRIPTION OF THE INVENTION

Figure 1:
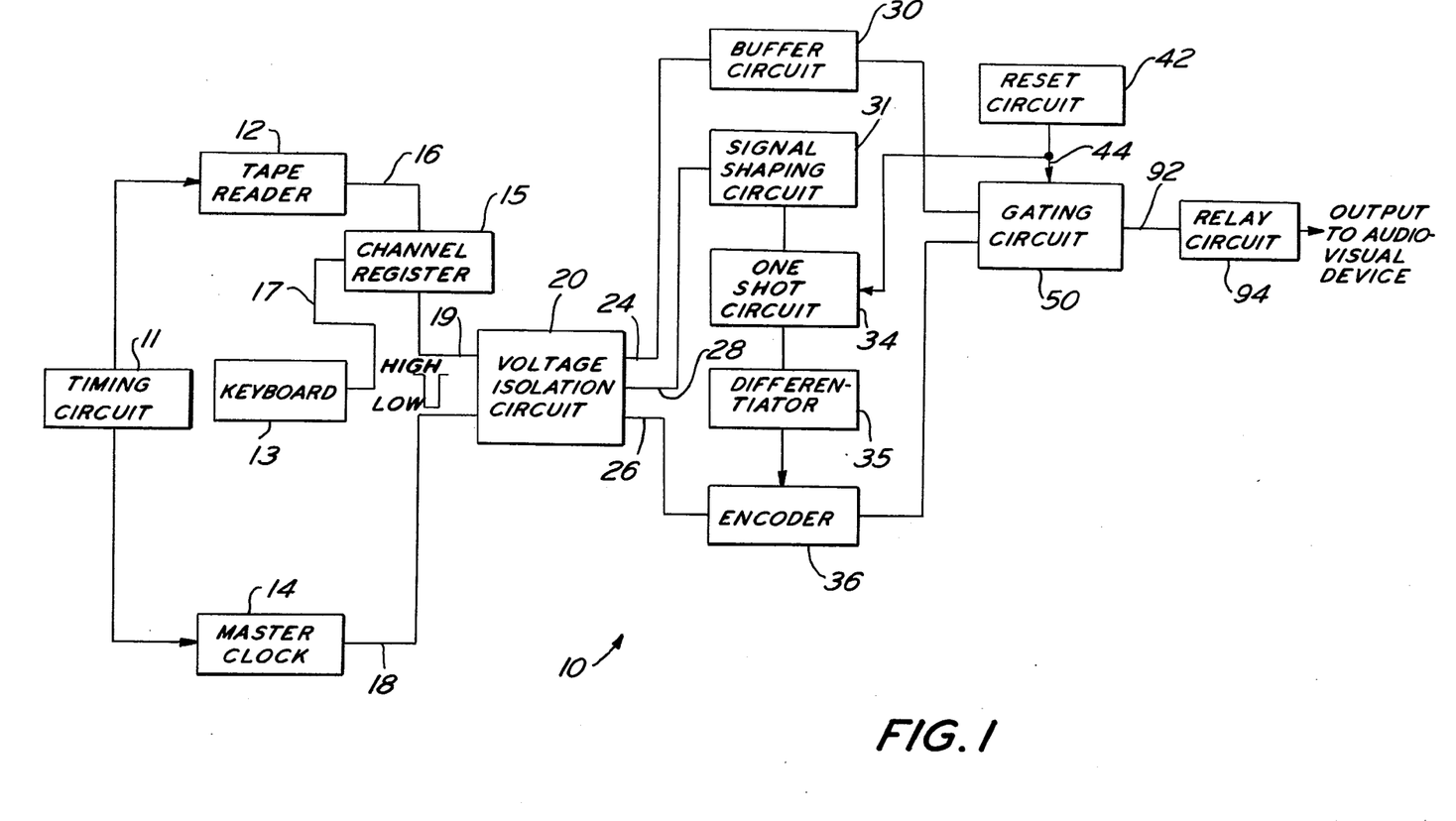
FIG. 1 is a block diagram of a channel expander constructed in accordance with the principles of the present invention.

Referring to the drawings in detail, wherein like numerals indicate like elements, FIG. 1 is a block diagram of the electrical circuitry used in practicing the present invention and is designated generally as 10. It will be assumed for purposes of the following discussion that a standard eight channel punched tape is used to program the sequence of operations of a plurality of audio-visual devices during a performance. However, it should be understood that punched tapes provided with more or less than eight channels may also be used with the present invention.

Each line of a punched tape is called a cue, and a line contains varying combinations of perforations in the eight channels. Thus, the first, third, fifth and seventh channels may be punched, or the second, fourth, sixth and eighth channels may be punched, and so forth. A tape reader 12 in the programmer senses the perforations in each cue electro-optically. The tape reader includes a stepping motor for stepping the punched tape through the reader. The tape may be stepped through the reader at a rate as high as 80 cues per second, but to preserve the life of the reader a maximum scan rate of 60 cues per second is preferred. In the normal mode of operation, the reader will advance the tape a single cue at a time and read a cue in response to a manually initiated command. On the other hand, in the automatic mode of operation, known as the high speed mode, the reader will advance and read the tape at a rate of 20 or 60 cues per second in response to a timing circuit 11 in the programmer. In either of the high speed modes, that is, at the 20 or 60 cue per second rates, the reader will automatically stop when it encounters a hole punched in the eighth channel of a cue if no other channels of the cue are punched.

The programmer is provided with eight output terminals, each terminal correspondng to a channel on the punched tape. In FIG. 1, the eight output terminals of the tape reader are indicated generally by line 16.

The master clock 14 generates a series of pulses which are derived from the same timing circuit 11 used to control the rate of advance of the tape reader. The series of pulses on line 18, connected to the output of the master clock 14, determines the rate at which the tape reader output signals on lines 16 are encoded in the high speed modes. In the preferred embodiment, the master clock 14 generates a series of pulses which have amplitudes of approximately 23 volts. For a scan rate of 20 cues per second, the pulses are "low" for approximately 30 milliseconds and "high" for approximately 20 milliseconds. For a scan rate of 60 cues per second, the pulses are low for approximately 10 milliseconds and high for approximately 6 milliseconds. The pulse repetition frequency of the pulses on line 18 determines the rate at which the tape reader output signals are encoded.

A keyboard 13 is provided in the programmer so that the input signals from tape reader 12 may be overridden when so desired. Keyboard 13 has eight keys which correspond to the eight channels in the tape. The operator can override any or all of these channels by depressing the appropriate key. If no tape is fed to the tape reader, the input signal to the herein disclosed invention can be derived solely from the keyboard 13. It should be noted that in such a situation the timing pulse input to the tape reader 12 will still be transmitted as an output signal thru line 16.

The output signals from tape reader 12 and keyboard 13 are fed into a channel register 15 in the programmer thru lines 16 and 17 respectively. The channel register performs an "OR" function on these two signals with the resulting (eight channel) signal transmitted thru line 19.

In the preferred embodiment of the invention described herein, the channel register output signals on lines 19 and the master clock pulses on line 18 are fed to a voltage isolation circuit 20 which provides voltage isolation and noise immunity. Additionally voltage isolation circuit 20 provides the voltage levels required to operate the logic circuitry described hereinafter. More specifically circuit 20 comprises nine identical voltage isolation devices (not shown), each of which may be a TIL 111 integrated circuit comprising a light emitting diode and a photo-transistor, although it should be understood that other voltage isolation devices may also be suitable for use in the present invention. Each voltage isolation device is provided with a light emitting diode which is connected to one of the nine lines comprising lines 19 and line 18. The output of each voltage isolation device is taken off the collector of the photo-transistor, and the nine outputs are indicated generally by lines 24, 26 and 28 in FIG. 1. The outputs of the voltage isolation devices which are connected to five of the line 19 outputs which correspond to the first five channels on the tape, are indicated generally by line 24. The outputs of the voltage isolation devices which are connected to the remaining three line 19 outputs which correspond to the remaining three channels on the tape, are indicated by line 26. And the output of the voltage isolation device which is connected to the output of the master clock 14 by means of line 18 is indicated by line 28.

At the output of a voltage isolation device, i.e., the collector of the photo-transistor, a negative going pulse will appear in response to a negative going pulse at the input of the voltage isolation device, i.e., at the light emitting diode. In the preferred embodiment, FIG. 1, the programmer generates a negative going pulse having an amplitude of approximately 24 volts on one of the lines 19 when a hole appears in the tape channel corresponding to that line. This pulse appears at the input to the voltage isolation device. In response to this input pulse, the voltage isolation device generates a negative going pulse between approximately five volts and zero volts. The five volts and zero volts levels are chosen to operate the logic circuitry described hereinafter.

Figure 2:
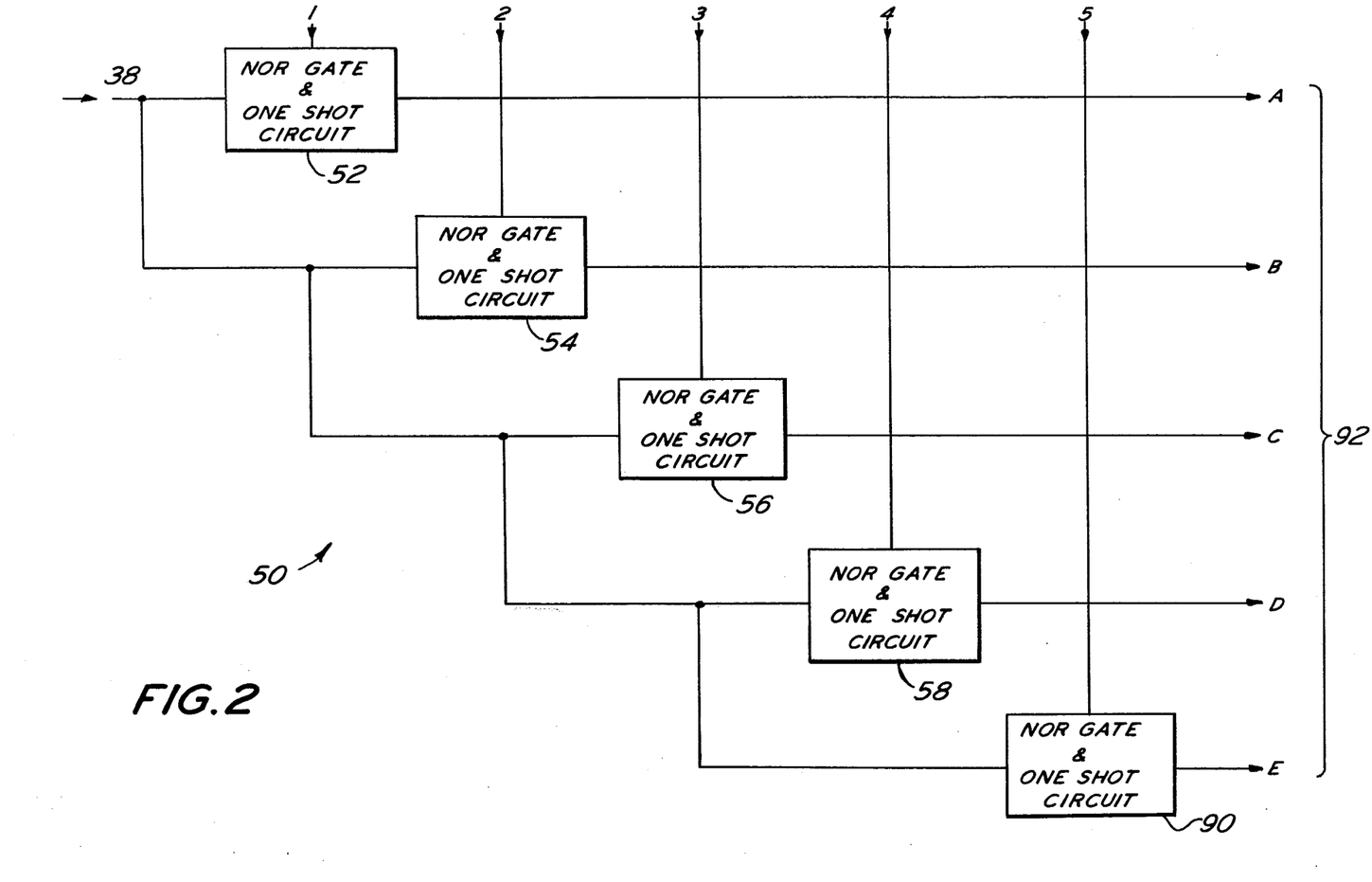
FIG. 2 is a detailed block diagram of a gating circuit in the present invention.
Figure 3:
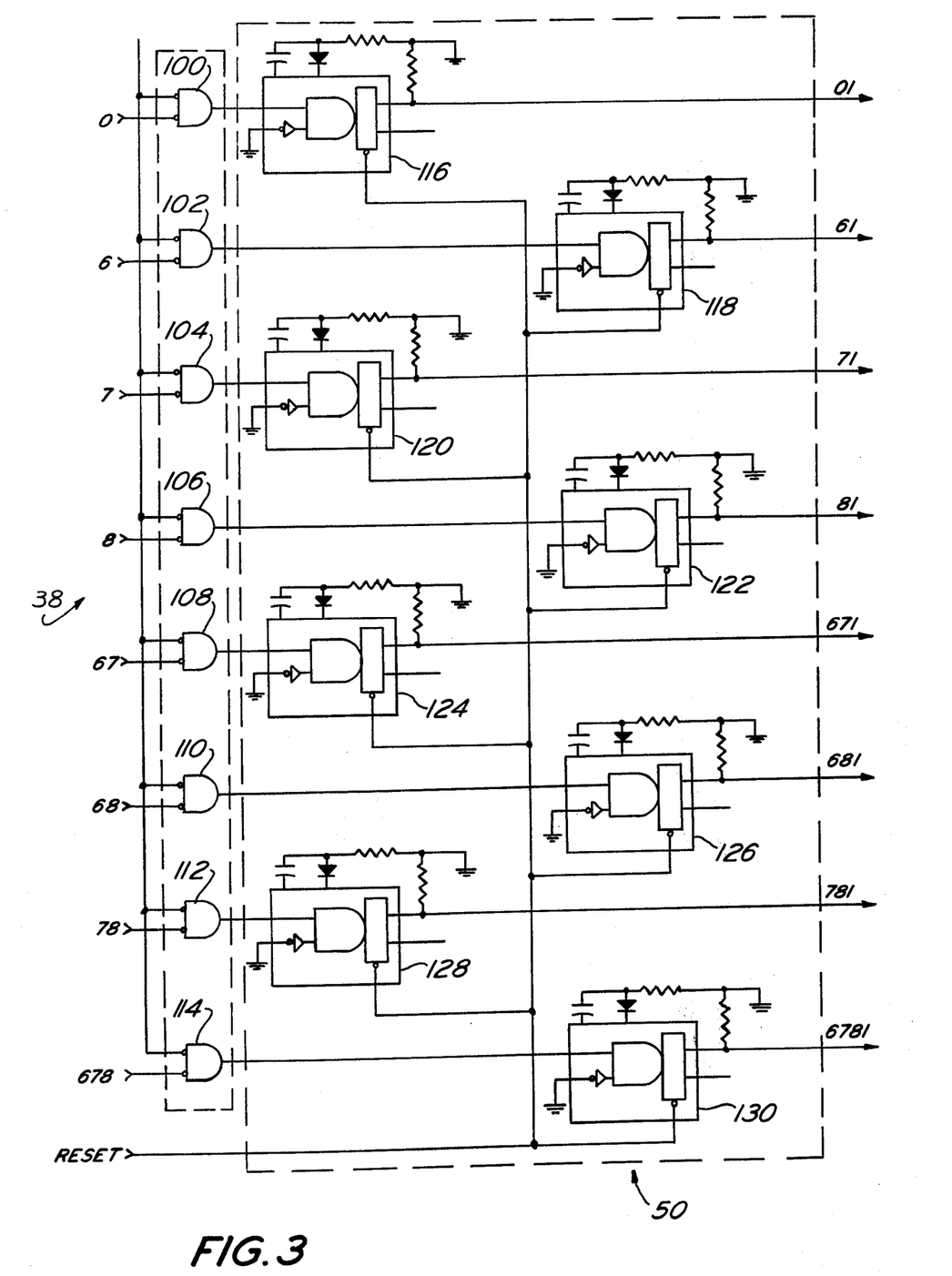
FIG. 3 is an electrical diagram of the gating circuit.
Figure 5:
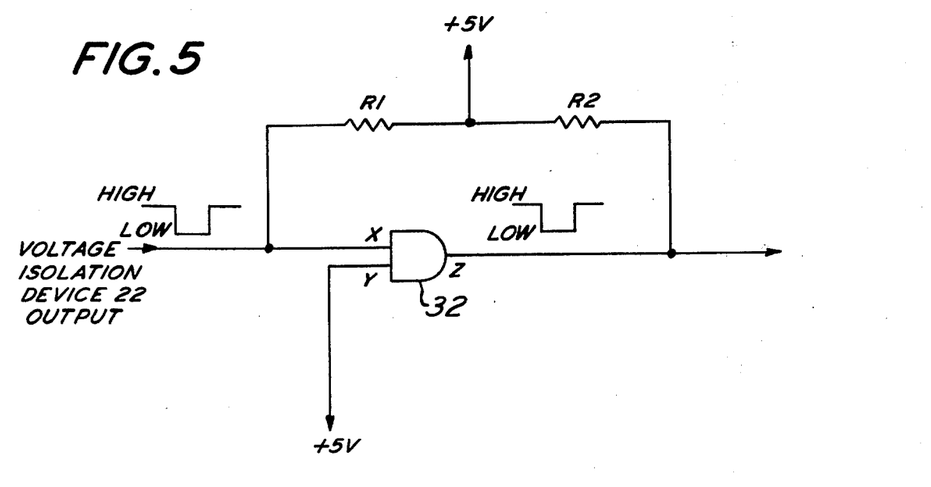
FIG. 5 is an electrical diagram of a buffer circuit.

As will become evident from the description of the gating circuit 50 which follows, each of the five lines 24, which correspond to the first five channels of the tape, is electrically connected to the inputs of eight NOR gate in gating circuit 50, FIGS. 2 and 3. To prevent undue loading of the voltage isolation devices, the lines 24 are connected to a buffer circuit 30 which, in turn, is connected to gating circuit 50. The buffer circuit 30 includes five identical AND gates, one of which is shown in detail in FIG. 5 and is designated by the numeral 32. Referring to FIG. 5, each AND gate 32 is provided with two input terminals X and Y. The Y-input terminal is connected to a five volt supply, and the X-input terminal is connected to one of the lines 24. Further, the X-input terminal is connected to a five volt supply through resistor R1, and the output terminal Z is connected to the same five volt supply through the resistor R2. In the preferred embodiment, R1 is 6800 ohms and R2 is 4700 ohms. When the associated photo-transistor in voltage isolation circuit 20 is "off", no current flows through R1 and a five volt signal appears at the X-input terminal and the X-out-put terminal remains at the five volt level. When the photo-transistor is "on" a negative going pulse having an amplitude of five volts appears at the X-input terminal, and the Z-output terminal is driven to the zero volt level.

The output of the voltage isolation device which is connected to the master clock output line 18 is designated, as previously mentioned, by line 28. Line 28 is connected to the input of signal shaping circuit 31. Preferably, circuit 31 is the same circuit shown in FIG. 5 with a low resistance (not shown), such as 47 ohms, added in series between the output of the voltage isolation device on line 28 and the junction of the X-input terminal and the resistor R1. The purpose of signal shaping circuit 31 is to sharpen the edges of the pulses appearing on line 28 to reliably trigger the one shot circuit 34.

The output of the signal shaping circuit 31 controls the operation of the one shot circuit 34. The one shot circuit 34, in the preferred embodiment, is a SN74123N integrated circuit which is connected to provide a positive going 6 millisecond pulse in response to the negative going edge of the input trigger signal. The output pulse from the one shot 34 controls the rate at which encoder 36 encodes the signals appearing on the three lines 26 which are connected to the output of voltage isolation circuit 20.

Figure 7:
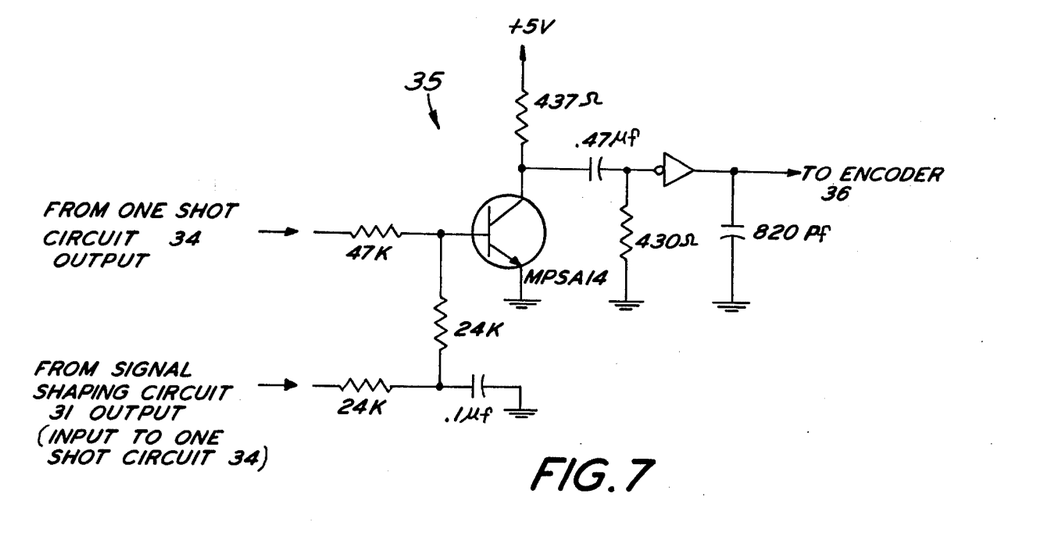
FIG. 7 is an electrical diagram of a differentiator circuit.

The output of one shot circuit 34 is connected to a differentiator circuit 35, shown in FIG. 7, which differentiates and inverts the leading edge of the 6 millisecond output pulse. The differentiator circuit 35 is a conventional circuit, and its operation is well-known in the art. Accordingly, further description of differentiator circuit 35 is not necessary in disclosing the present invention.

Figure 6:
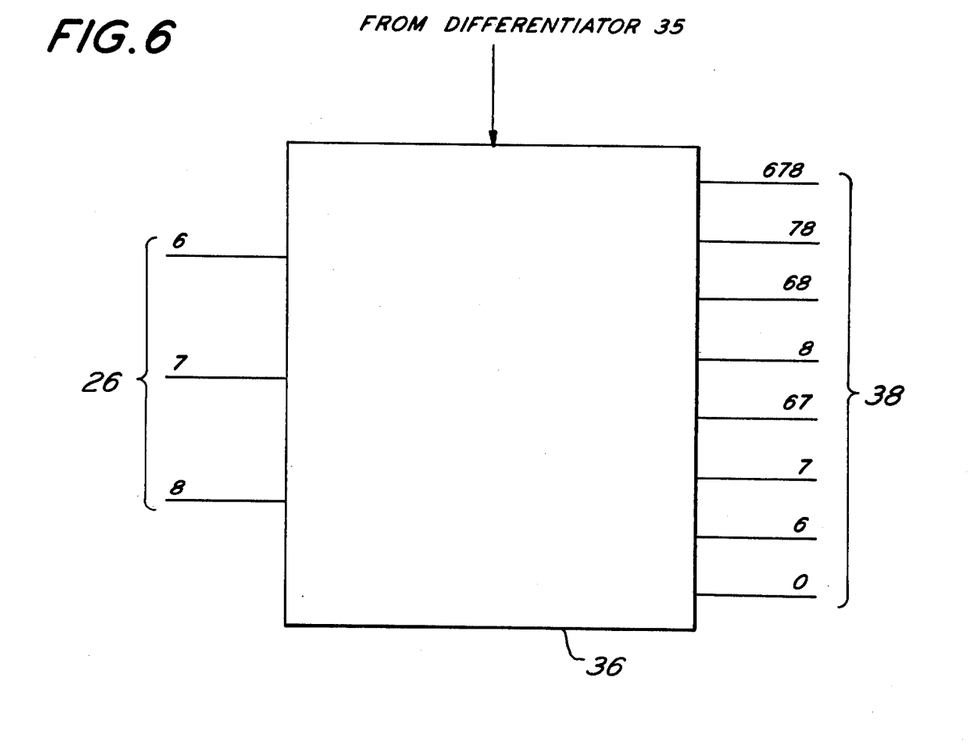
FIG. 6 is a block diagram of an encoder with coded inputs and outputs.

In the preferred embodiment, encoder 36 is a Sn7442N BCD encoder. The encoder 36 receives the signals appearing on lines 26 and, in response to the output of differentiator circuit 35, encodes the signals into eight output signals, each output signal appearing on one of the eight lines indicated generally in FIG. 1 by the numeral 38. Referring to FIG. 6, there is shown a block diagram of encoder 36 having three inputs 6, 7 and 8, corresponding to the three lines 26, and eight outputs 678, 78, 68, 8, 67, 7, 6, and o, corresponding to the eight output lines 38. As mentioned previously, each cue of the punched tape is divided into eight channels. All eight channels are scanned by the tape reader 12, and each of the programmer output lines 19 corresponds to one of the eight channels of a cue. Each of the eight lines 19 is connected to voltage isolation circuit 20. The five output lines 24 of voltage isolation circuit 20 correspond to the first five channels on the punched tape, and the three output lines 26 of current isolation circuit 20 correspond to the last three channels on the tape. For ease of reference, the first five channels on the tape are identified by the numbers 1, 2, 3, 4 and 5, and the last three channels on the tape are identified by the numbers 6, 7 and 8. Thus, in FIG. 6, line 26 represents the three outputs of voltage isolation circuit 20 which correspond to the last three channels, 6, 7 and 8, on the tape. The encoder 36 combines the three lines 26 none, one, two and three at a time by conventional logic circuitry. Consequently, the encoder 36 has eigh output lines, indicated generally as 38, each output line corresponding to a different combination of the three input lines 26. Stated otherwise, each of the eight output lines 38 of encoder 36 corresponds to a different combination of the last three channels on the punched tape.

For example, if none of the last three channels of a cue are punched, there will be no input on lines 6, 7 and 8. When the output pulse from differentiator circuit 35 triggers the encoder 36, an output signal appears on output line 0 while the other seven output lines carry no output signals. This indicates that the last three channels on the cue have been examined and none contain a punched hole. Suppose, as a further example, that channels 6 and 7 are punched but channel 8 is not. An output signal will then appear on output line 67, and the other seven output lines of encoder 36 will carry no output signals. This indicates that only channels 6 and 7 of the last three channels on the cue have been punched. The foregoing analysis may be repeated for each combination of punched holes in the last three channels of a cue, channels 6, 7 and 8.

In the preceding description of the invention, it has been shown that the three lines 26, corresponding to the last three channels on a cue, are connected to encoder 36, while the five lines 24, corresponding to the first five channels of a cue, are connected to buffer circuit 30, FIG. 1. Buffer circuit 30 includes five AND gates 32 FIG. 5, each AND gate 32 being connected to one of the five lines 24. Additionally, it has been shown that line 28 is connected to signal shaping circuit 31 which controls the operation of a one shot circuit 34 which, in turn, controls the rate at which encoder 36 encodes the signals appearing on the three lines 26. Each of the five AND gates 32 which are connected to the five lines 24 generates an output signal on one of five lines indicated generally as 40 in FIG. 1. Lines 40 from buffer circuit 30 and the eight output lines 38 from encoder 36 are connected to gating circuit 50.

Referring to FIG. 2, the gating circuit 50 is shown in further detail. Using the system of notation adopted in the preceding portion of the description of the invention, the five output lines 40 of buffer circuit 30 correspond to the first five channels of a cue, channels 1, 2, 3, 4 and 5 and the eight output lines 38 from encoder 36 correspond to the eight possible combinations of the last three channels on a cue, namely, 678, 78, 68, 8, 67, 7, 6 and 0. Each of the eight lines 38 is fed to NOR gate and One Shot circuits 52, 54, 56, 58 and 90. NOR gate and One Shor circuits 52, 54, 56, 58 and 90 are identical circuits, each circuit comprising a NOR gate connected in series with a One Shot device. The One Shot device may be a SN74123N integrated circuit, or any other suitable one shot device. As shown in FIG. 2, the one line of the five lines 40 which corresponds to channel 1 on the tape is connected to NOR gate and One Shot 52, the line corresponding to channel 2 on the tape is connected to NOR gate and One Shot circuit 54, and the other lines corresponding to channels 3, 4 and 5 of the tape are connected, respectively, to NOR gate and One Shot circuits 56, 58, and 90. Each possible combination of the last three channels on a cue, as represented by the eight lines 38, is combined with each of the first five channels on the cue, represented by the five lines 40, to generate five sets of output lines A, B, C, D, and E, designated generally as 92. Each of the five sets of output lines A, B, C, D and E itself includes eight output lines so that the total number of output lines 92 is forty. Each of the forty output lines 92 carries a central signal for controlling one audio-visual device in accordance with the program on the tape and, accordingly, the capacity of the programmer is expanded from eight to forty channels.

Referring to FIG. 3, the NOR gate and One Shot circuit 52 FIG. 2, is shown in further detail. Since circuits 52, 54, 56, 58 and 90 are identical, the following description of Circuit 52 applies to circuits 54, 56, 58 and 90 as well. In FIG. 3, the one line of the five output lines 40 of buffer circuit 30 which corresponds to the first channel on the tape is designated as 1. The eight output lines 38 from encoder 36 are designated as 0, 6, 7, 8, 67, 68, 78, and 678 in accordance with the notation previously adopted. Each of the eight lines 38 is connected to one of the NOR gates 100, 102, 104, 106, 108, 110, 112, and 114 which are identical and are indicated generally as 200. Each of the NOR gates 200 is connected in series to one of eight one shot devices 116, 118, 120, 122, 124, 126, 128, and 130, which are identical and are designated generally as 300. Since each series connection of one of the NOR gates 200 to one of the One Shot devices 300 is identical in FIG. 3, for purposes of discussion it suffices to describe the operation of one such connection and, in particular, the connection of NOR gate 100 to One Shot device 116.

If the first channel of a cue is punched, a low signal, that is, a zero volt signal, will appear on line 1 at the input to NOR gate 100. The NOR gate 100, however, will not generate an output signal unless, in addition, none of the last three channels of a cue are punched. Conversely, if the last three channels of a cue are empty, a low signal will appear on line 0, but unless the first channel of the same cue is punched, NOR gate 100 will generate no output signal. Only when the last three channels of a cue are empty and, in addition, the first channel of the same cue is punched, will NOR gate 100 generate an output signal. Further, given the latter conditions, NOR gate 100 will generate an output signal despite the condition of channels 2, 3, 4 and 5 of the cue. The output signal generated by NOR gate 100 will trigger the one shot device 116, and an output pulse will appear at the line labeled 01 in FIG. 3. The numerical label 01 also identifies one of a plurality of audio-visual devices which is activated by the foregoing circuitry when none of the last three channels on a cue, and at least the first channel of the first five channels of the cue, are perforated. The foregoing analysis may be repeated for each of the NOR gates 200 and each of the NOR gate and One Shot Circuits 52, 54, 56, 58 and 90.

Each of the one shot circuits referred to in the preceding description must be reset when power is initially applied to the system to avoid triggering an audio-visual device by a transient spike. Referring to FIG. 1, there is shown a Reset circuit 42 which is connected to gating circuit 50 by line 44. The reset circuit 42 generates a negative going pulse of approximately 5 volts amplitude to the reset terminals of one shot circuits 52, 54, 56, 58, 90 and 34.

Figure 8:
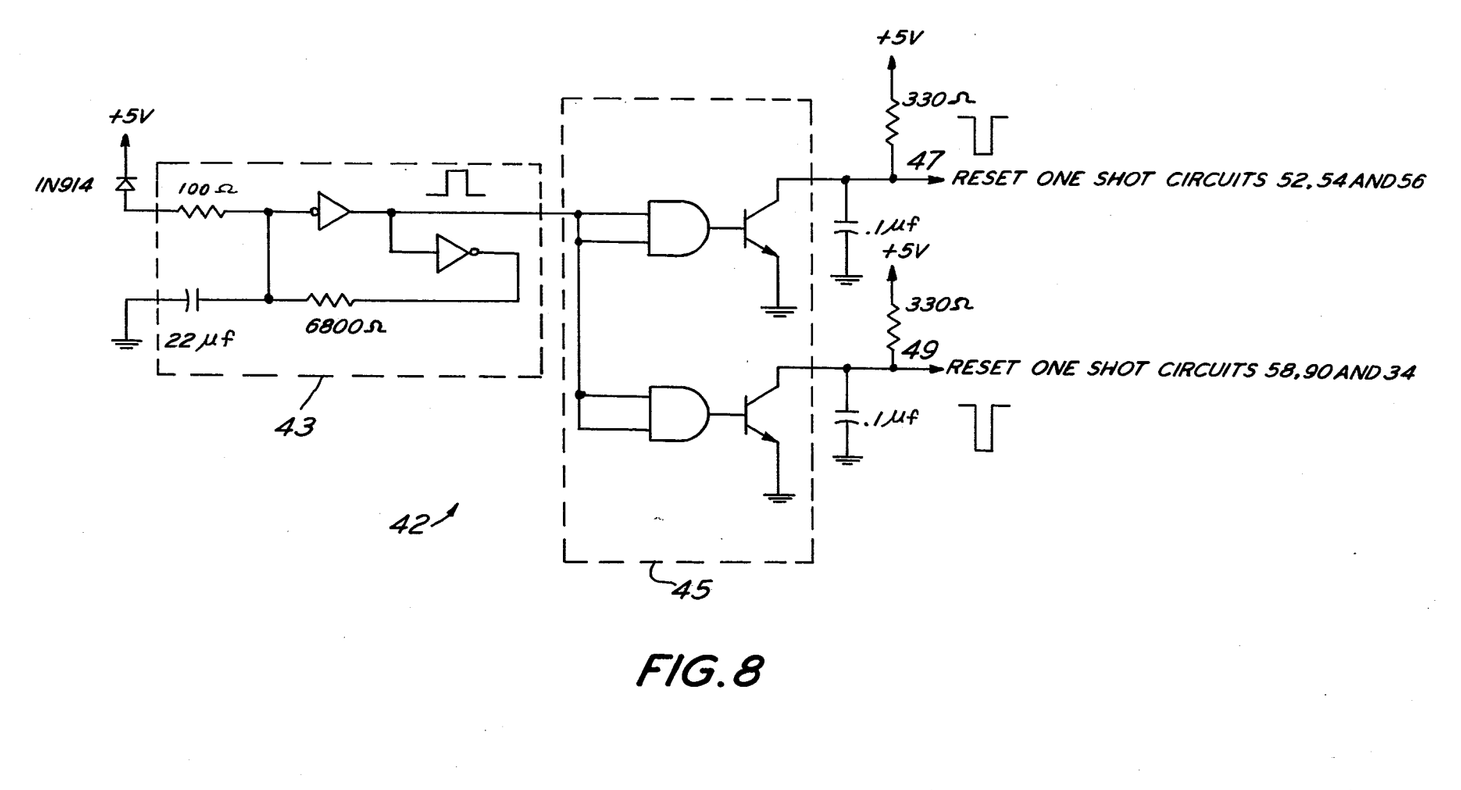
FIG. 8 is an electrical diagram of a reset circuit.

Referring to FIG. 8, the reset circuit 42 includes an oscillator circuit 43 and Driver circuit 45. The oscillator circuit 43 is a conventional circuit which generates a positive going pulse of approximately 35 milliseconds duration. The output of the oscillator circuit 43 drives Driver circuit 45 which comprises identical pairs of AND gates connected in series with transistors. The driver circuit 45 may be a SN75452P integrated circuit or any other suitable driver circuit.

Reset circuit 42 is provided with two output channels, 47 and 49, rather than a single output channel in order to avoid unduly loading the driver circuit 45. Thus, using twin AND gate and transistor pairs in driver circuit 45, each of the one shot circuits 52, 54, 56, 58, 90 and 34 will be reliably reset. When the power is initially applied to the system, the reset circuit 42 resets each one shot circuit. Thereafter, the one shot circuits are controlled in accordance with the circuitry described above.

Figure 4:
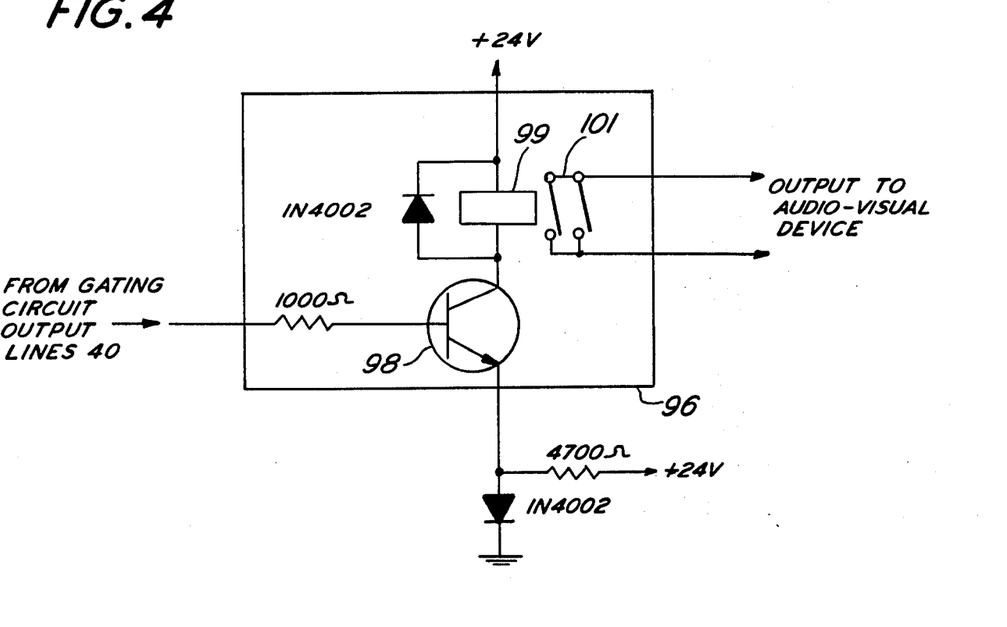
FIG. 4 is an electrical diagram of a relay circuit.

The 40 output lines 92 from gating circuit 50 are connected to relay circuit 94, as shown in FIG. 1. Relay circuit 94 contains 40 identical relay devices 96 which are shown in detail in FIG. 4. A transistor 98 is switched on and off by the signal appearing on the one line of the forty lines 92 which is connected to the transistor base. In the preferred embodiment the transistor 98 is a 2N2102 transistor although other suitable transistors may also be used. A solenoid 99 is connected in the collector circuit of the transistor 98, and the current flow through the solenoid controls the operation of a switch 101 which is connected to one of a plurality of audio-visual devices. The operation of each of the relay devices 96 connected to each of the lines 92 is identical.

In operation, the programmer senses those channels of a cue that have been perforated and generates an output signal on each line 16 which is associated with a perforated channel. The signals corresponding to the last three channels of the cue are encoded by encoder 36 which generates the encoded signals on lines 38. The signals appearing on lines 40, at the input to gating circuit 50, correspond to the first five channels on the tape, and the signals on line 40 are combined with the signals on line 38 to produce an array of 40 different output signals on the forty output lines 92 from gating circuit 50. Each of the lines 92 controls a relay device 96 which, in turn, controls the state of an audio-visual device. Thus, although standard eight hole punch tape is used to supply information to a programmer which controls the sequence of operations of a plurality of audio-visual devices during a performance, as many as forty such audio-visual devices may be controlled by the standard eight hole tape.

Although a preferred embodiment of the invention has been described above, various modifications may be made within the spirit and scope of the present invention. For example, although standard eight hole punch tape has been specified in conjunction with the invention, it may readily be appreciated that other tapes provided with more or less channels may also be used, the invention being modified accordingly by a person having ordinary skill in the art. Similarly, although a particular relay device 96 has been described for operating an audio-visual device in response to the signals generated on lines 92, any other momentary closure device may also be suitable for this purpose.

Further, although voltage logic levels of zero and five volts have been referred to in describing the preferred embodiment of the invention, other voltage logic levels may also be used if other logic circuitry is employed.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for simultaneously controlling the operational states of a plurality, $p$, of devices in response to pre-programmed information stored in $m$ channels of a memory device, where $m$ is an integer and $m < p$, comprising:

means for generating $m$ digital signals in response to said pre-programmed information;

means for combining $n$ of said $m$ digital signals $j$ signals at a time, where $j$ is an integer including zero and has a maximum value equal to $n$, and for generating a set of encoded signals representing the combinations of said $n$ digital signals;

means for gating said set of encoded signals with the remaining $(m - n)$ digital signals generated in response to said pre-programmed information to produce a plurality, $p$, of output signals, where $p > m$; and means for simultaneously controlling the operational states of the plurality, $p$, of devices in response to said $p$ output signals.

2. Apparatus in accordance with claim 1 wherein said pre-programmed information is stored in said memory device by means of punched holes and said generating means is an electro-optical generating means.

3. Apparatus in accordance with claim 1 wherein said means for combining includes a BCD encoder.

4. Apparatus in accordance with claim 1 wherein said gating means includes a plurality of pairs of series connected NOR gates and one-shot circuits operatively connected to said combining means and said generating means.

5. Apparatus in accordance with claim 1 wherein said controlling means includes a plurality of transistors operatively connected to said gating means, each transistor being operatively connected to a solenoid for controlling at least one of said $p$ devices.

6. Apparatus in accordance with claim 4 including means to reset each of said one shot circuits when power is initially applied thereto.

7. Apparatus in accordance with claim 1 including means for isolating the voltage levels generated by said generating means from the inputs to said combining means and said gating means.

8. Apparatus in accordance with claim 7 wherein said voltage isolating means is an optical voltage isolating means.

9. Apparatus in accordance with claim 1 wherein said means for combining includes means for generating a series of digital clock pulses for controlling the rate at which said $n$ digital signals are encoded.

10. Apparatus in accordance with claim 1 wherein said memory device is a punched tape.

11. Apparatus for simultaneously controlling the operational states of a plurality, $p$, of devices in response to pre-programmed information stored in $m$ channels of a punched tape where $m$ is an integer and $m < p$, comprising:

a tape reader for sensing the presence of punched holes in the tape and for generating $m$ digital signals at a first set of voltage levels in response thereto;

a voltage isolation circuit for converting said $m$ digital signals at said first set of voltage levels to $m$ digital signals at a second set of voltage levels;

an encoder operatively connected to $n$ of said voltage isolation circuit outputs, where $n < m$, for combining $n$ of said $m$ digital signals at said second set of voltage levels and generating a set of encoded signals in response thereto;

a gating circuit for gating the $(m-n)$ digital signals generated by said voltage isolation circuit which are not encoded by the encoder with the set of encoded signals generated by the encoder to generate a plurality, $p$, of output signals, where $p > m$; and a plurality of relays for controlling the operational states of said $p$ devices in response to said $p$ output signals.

12. Apparatus in accordance with claim 11 wherein said encoder is a BCD encoder.

13. Apparatus in accordance with claim 11 wherein said gating circuit includes a plurality of pairs of series connected NOR gates and one-shot circuits operatively connected to said voltage isolation circuit and said encoder.

14. Apparatus in accordance with claim 11 including a plurality of transistors operatively connected to said gating circuit, each transistor being operatively connected to a solenoid for controlling at least one of said $p$ devices.

15. Apparatus in accordance with claim 13 including means to reset each of said one shot circuits when power is initially applied thereto.

16. Apparatus in accordance with claim 11 wherein said voltage isolation circuit is an optical voltage isolation circuit.

17. Apparatus in accordance with claim 11 wherein said encoder includes a master clock for generating a series of digital pulses at an input to the encoder to control the rate at which said $n$ digital signals are encoded.

18. Apparatus in accordance with claim 11 wherein the number of channels, $m$, on the punched tape is 8, the number of digital signals, $n$, encoded by said encoder is 3, and the number of devices, $p$, is 40.

19. Apparatus for controlling a plurality $p$ of devices in response to $m$ channels of pre-programmed information where $p$ is greater than $m$, comprising:
- first means for simultaneously generating a plurality of output signals in response to a first portion of channels of said pre-programmed information;
- second means for simultaneously generating a plurality of control signals in response to said first generating means output signals and a second portion of channels of said pre-programmed information separate and distinct from said first portion; and
- means for simultaneously operating said plurality $p$ of devices in response to said second generating means control signals.

20. A method for controlling a plurality $p$ of devices in response to $m$ channels of pre-programmed information where $p$ is greater than $m$, comprising:
- simultaneously generating a plurality of output signals in response to a first portion of channels of said pre-programmed information;
- simultaneously generating a plurality of control signals in response to said plurality of output signals and a second portion of channels of said pre-programmed information separate and distinct from said first portion; and
- simultaneously operating said plurality $p$ of devices in response to said control signals.

* * * * *